United States Patent [19]

Bergsma et al.

[11] Patent Number: 4,751,940
[45] Date of Patent: Jun. 21, 1988

[54] CHECK VALVE

[75] Inventors: Rudolph Bergsma; Joseph B. Newton, both of Ann Arbor, Mich.

[73] Assignee: G.T. Products, Inc., Ann Arbor, Mich.

[21] Appl. No.: 56,068

[22] Filed: May 29, 1987

[51] Int. Cl.$^4$ .............................................. F16K 15/00
[52] U.S. Cl. .................................................. 137/199
[58] Field of Search ................ 137/197, 199, 517, 859

[56] References Cited

U.S. PATENT DOCUMENTS

| | | | |
|---|---|---|---|
| 2,261,648 | 11/1941 | Goldstein | 137/199 |
| 3,326,230 | 6/1967 | Frank | 137/199 |
| 3,421,534 | 1/1969 | Henderson | 137/199 |
| 3,508,576 | 4/1970 | Gross | 137/859 |
| 3,719,197 | 3/1973 | Pannier | 137/199 X |
| 4,188,978 | 2/1980 | De Lorenzo | 137/859 |
| 4,372,353 | 2/1983 | Weas | 137/199 X |

Primary Examiner—Alan Cohan
Attorney, Agent, or Firm—Krass & Young

[57] ABSTRACT

A check valve using a porous membrane to discriminate between gases and liquids. An elastomeric porous membrane disposed in the valve body at right angles to flow bears directly against a non-porous closure plate which is held off of a valve seat by a spring whose force acts opposite to the direction of fluid flow. The valve, therefore, is normally open. Air flows through the membrane with relatively little resistance and therefore passes through the valve unimpeded. Liquid, on the other hand, meets substantially high resistance to flow and creates a force on the membrane opposing the bias force exerted by the spring. Liquid, therefore, tends to displace the membrane and the closure member against the valve seat to close the valve. The device is advantageously applied to fuel management systems.

7 Claims, 2 Drawing Sheets

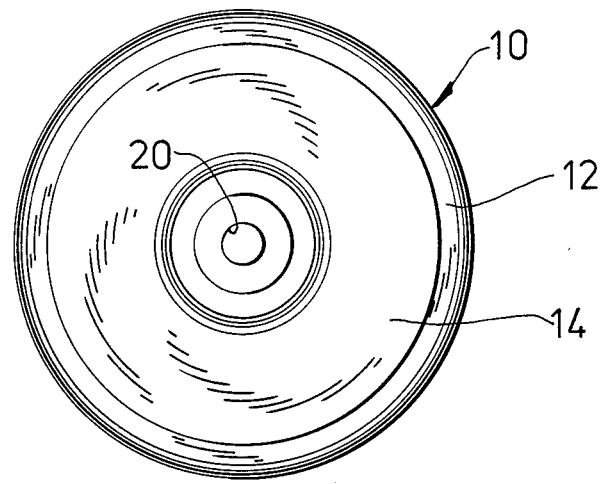
FIG 3
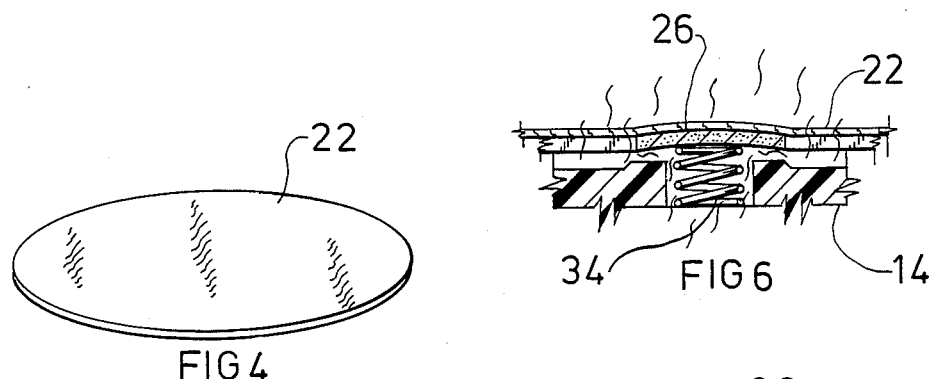
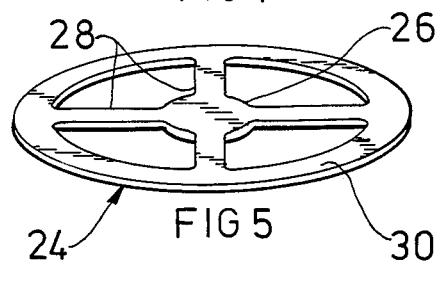
FIG 4
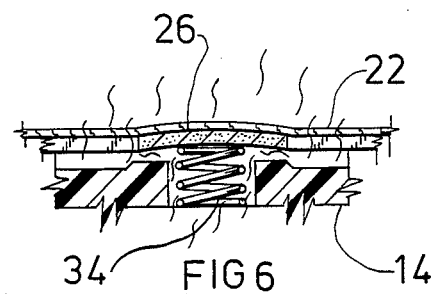
FIG 6
FIG 5
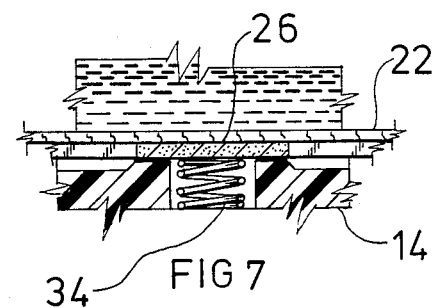
FIG 7

CHECK VALVE

INTRODUCTION

This invention relates to flow control devices known as check valves and particularly to a check valve which permits materials of one character to pass through the valve essentially unimpeded, but which impedes or completely stops the flow of materials of a different character.

BACKGROUND AND PRIOR ART

Check valves are normally used in material flow control systems to discriminate between directions of flow, i.e., a closure member is held off of a seat by material flow in one direction but is seated by flow of the same or a similar material in the opposite direction. A ball check valve is one well-known example.

Another type of direction-responsive check valve is shown in the U.S. Pat. No. 4,523,610 to Orrico. The Orrico check valve utilizes an elastomeric membrane stretched across a valve chamber normal to the direction of fluid flow. The membrane has a solid, impermeable center but has a circular pattern of relatively large holes formed radially outwardly of the solid center portion. When fluid flows into the valve body in one direction, the large holes in the membrane permit the flow of fluid to flow on through the valve. When fluid flows in the opposite direction, the center section of the membrane is, at least in theory, displaced in the direction of fluid flow stretching the membrane and essentially closing a number of outlet holes in the valve body.

U.S. Pat. No. 3,749,353 to Pauliukonis shows another elastomeric membrane valve in which the normal position of the membrane permits flow parallel to and along one face of the membrane. The application of fluid pressure to the opposite face of the membrane from a pilot or control source flexes the membrane into a second position which impedes or stops material flow. A similar membrane valve with mechanical actuation is shown in U.S. Pat. No. 3,275,291 to Meijers.

SUMMARY OF THE INVENTION

We have provided a material flow control valve which discriminates according to the physical character of the flow material rather than according to flow direction. Specifically, our valve is normally open to permit material of a first character to flow in a given direction but is closed to restrict or entirely stop flow of a different character material in the same direction.

We have found that our valve is particularly well suited to discriminate between a gas, such as air, and a liquid, such as gasoline or other liquid fuel. In this application, we prefer to use a porous membrane for the element which senses the character of the flow materials and which actuates the valve.

As hereinafter described in greater detail, our invention is advantageously applied to fuel management systems. However, the principles of the invention are readily usable in numerous and diverse applications.

BRIEF DESCRIPTION OF THE DRAWING

FIG. 3 is a bottom view of the valve of FIGS. 1 and 2;

FIG. 4 is a perspective view of the membrane which is utilized in the valve of FIG. 1;

FIG. 5 is a perspective view of an integral seal and closure member utilized in the valve of FIG. 2;

FIG. 6 is a partial sectional view of the valve of FIG. 2 showing the condition of the valve elements in response to gas flow; and FIG. 7 is sectional view of the valve of FIG. 2 showing the position of the elements in response to liquid flow.

DETAILED DESCRIPTION OF THE PREFERRED EMBODIMENT

Figure 1:
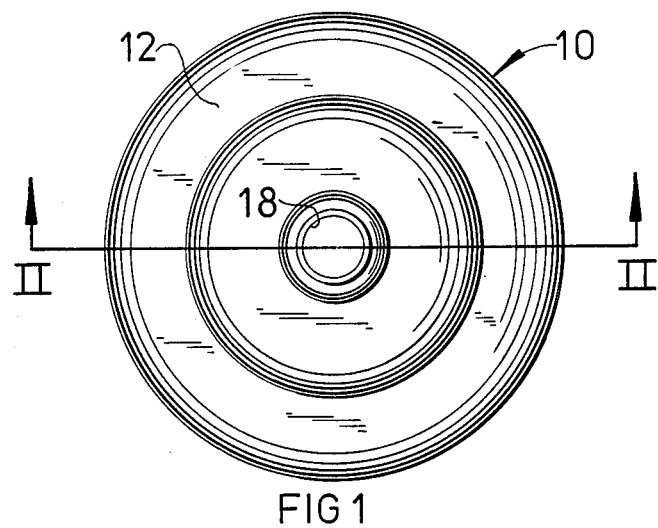
FIG. 1 is a top plan view of a valve embodying our invention.

Referring to the several figures of the drawing, a valve 10 comprises a housing made up of a steel cover 12 and a thermoplastic body 14. The radially outboard portion of the cover 12 is crimped over the larger diameter portion of the thermoplastic body 14 to unite the two components. Cover 12, in combination with body 14, defines a valve chamber 16. In addition, the cover 12 defines an inlet 18 to the chamber, and the valve body 14 defines an outlet 20 from the chamber.

Figure 2:
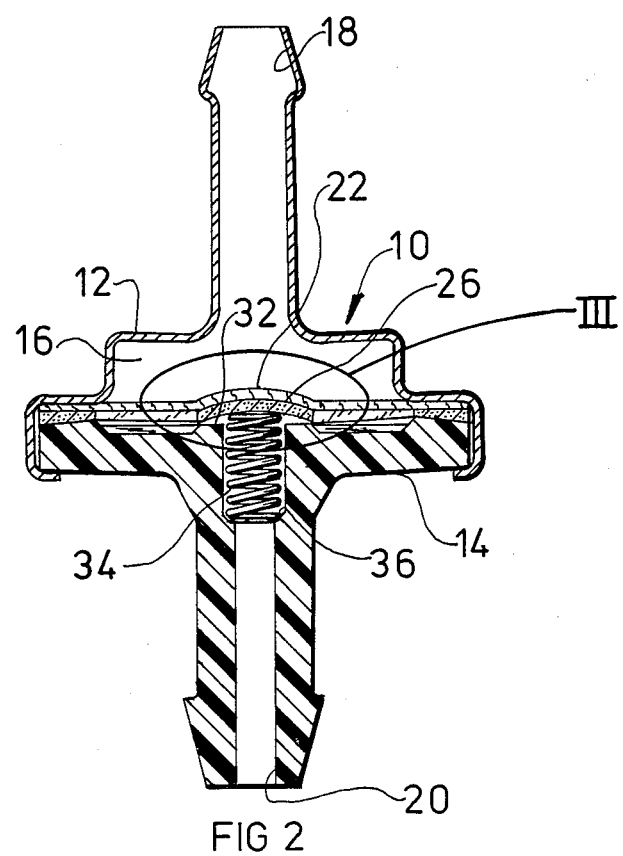
FIG. 2 is a side sectional view of the valve of FIG. 1.

Disposed across the chamber at essentially right angles to the direction of material flow from inlet 18 to outlet 20 is a discriminator member in the form of a porous membrane 22. Immediately adjacent and under the membrane 22 is a nitrile nylon valve plate 24 having a solid center portion 26, a plurality of radial spokes 28, and a solid rim portion 30. As best shown in FIG. 2, the rim portion 30 of the valve plate 24 as well as the outboard portions of the membrane 22 are held in place by the crimped outboard portion of the cover 12, the rim portion 30 of the nitrile nylon plate 24 forming a seal. Valve body 14 is molded to define an axially raised annular seat 32 concentric with and immediately surrounding the outlet 20. The solid center portion 26 of the valve plate 24 is dimensionally arranged to mate with and bear sealingly against the seat 32 to close the valve under certain conditions hereinafter desribed.

The closing function operates against the bias force of a spring 34 which sits in a radially enlarged portion of the outlet 20 and is essentially trapped under compression between a radial shoulder 36 in the outlet 20 and the face of the solid center portion 26 of the valve plate 24.

The spring 34 normally holds the adjacent combination of the valve plate and the membrane 22 in the raised position shown in FIGS. 2 and 6 wherein the solid center section 26 of the valve plate 24 is spaced from the seat 32. Under these conditions, non-wetting, low density materials such as gases are permitted to flow freely through the valve from the inlet 18 to the outlet 20. However, materials of a more dense character or a larger molecular weight, such as fluids, when attempting to flow from the inlet 18 to the outlet 20, are restricted by the porous membrane 22 and create a force tending to displace the membrane and the associated valve plate 24 toward the seat 32 against the biasing force of the spring 34 to either partially or fully seat valve plate center portion 26 against the seat 32 to impede or stop the flow of the second material.

In the preferred embodiment, the cover 12 is made of SAE 1010 draw-quality, cold rolled steel, the valve body 14 is made of glass-fiber-reinforced thermoplastic polyester, and the valve plate 24 is made of nitrile nylon, a material available from Chemprene under the designation CRP 6023. The membrane 22 for an application calling for discrimination between air and gasoline is made of "VERSAPOR," a material available from Gelman Instruments, Inc. "VERSAPOR" is a non-woven synthetic fibrous filter having a pore size on the order of 5 microns. The spring 34 is stainless steel.

An industrial application of the valve 10 is a fuel management system wherein it is desirable to permit the essentially unimpeded flow of air through the valve 10 from input 18 to outlet 20 under normal operating conditions but to substantially immediately close the valve in response to a fault condition which permits fuel (gasoline) to enter the valve chamber 16 through the inlet 18 under relatively high pressure. In this application, the valve 10 is connected into a line which normally passes air from the inlet 18 to the outlet 20 to a pressure comparator; i.e., an actuator responsive to a pressure differential. In the normal operating condition, spring 34 holds the nylon closure element 26 away from the seat 32. Air entering inlet 18 readily flows through the pores in the membrane 22 and through the large holes in the valve plate 24 to the outlet 20. The pore size in the membrane 22 is such as to present relatively little resistance to the flow of air. Accordingly, the net force tending to displace the membrane 22 in the direction of flow is insufficient to overcome the bias provided by spring 32. The closure member 24, therefore, remains displaced from the seat 32 and airflow from inlet 18 to outlet 20 continues substantially unimpeded.

However, if liquid fuel enters inlet 18 under pressure, the fuel immediately encounters the membrane 22 where, because of the small pore size and the tendency of the fuel to wet the membrane and fill the pores, substantial resistance to flow is encountered. This substantial resistance, taken over the effective area of the membrane 22, creates a force which is sufficient to displace the center section 26 of the valve plate 24 against the bias of the spring 34. The solid center section 26 thus moves into sealing engagement with seat 32 and stops flow of the liquid fuel from the inlet 18 to the outlet 20. The open condition is illustrated in FIG. 7, and the stop condition is illustrated in FIG. 8.

While the embodiment described above is illustrative of the invention, it will be apparent to those skilled in the art that various modifications and embellishments of the basic invention are possible. For example, the valve body may be constructed in various ways and from various materials and assembled together using ordinary fasteners rather than the crimping procedure described above with respect to the illustrative embodiment. The membrane 22 may be varied and/or selected according to the specific discrimination function which is desired, it being understood that the bias force provided by spring 34 must be selected to be compatible with the discrimination function. In addition, the valve may be constructed such that the membrane closes only some, rather than all, outlet ports.

We claim:

1. A fluid discriminator valve of a type which permits through-flow of a first fluid but impedes of stops through-flow of a second fluid comprising:
    a valve body defining a longitudinal fluid passage having an inlet and an outlet, a chamber in said passage mediate said inlet and outlet, said chamber being of substantially greater lateral dimension than the balance of said passage;
    means associated with said outlet to define a valve seat adjacent said chamber;
    a porous discriminator membrane disposed in said chamber and fully across said passage;
    said membrane offering low resistance to flow of a first fluid and high resistance to flow of a second fluid;
    a fluid-impermeable sheet-like valve member disposed adjacent and in full face-to-face contact with said membrane and between said membrane and said seat, said valve member comprising a solid center disk and a plurality of radial extensions, the spaces between the center disk and the extensions being open to permit fluid flow and being large in comparison to the area of said radial extensions; and
    a helical compression spring disposed concentrically in the passage between said outlet and the center disk and bearing directly against said center disk to hold said center disk off said seat to permit fluid flow from said inlet to said outlet but yielding to pressure created by high resistance fluid flow through said porous membrane to allow said center disk to bear against said seat.

2. A check valve as defined in claim 1 wherein the discriminator member is a flexible, porous membrane.

3. A check valve as defined in claim 1 wherein said housing comprises first and second components which are joined together, the first component defining said inlet and the second component defining said outlet.

4. Apparatus as defined in claim 1 wherein the valve housing comprises first and second components which are joined together to form a unitary body, and seal means for providing a seal between the first and second elements to prevent the loss of fluid from the valve housing.

5. A check valve as defined in claim 4 wherein the seal means and the closure member are integral.

6. A check valve as defined in claim 1 wherein the discriminator member is a synthetic porous polymeric material having a pore size in the micron range which presents low resistance to the flow of air therethrough but presents high resistance to the flow of liquids therethrough.

7. Apparatus as defined in claim 1 wherein said valve member includes a circumferential band integral with said spokes at the radial extremeties thereof, said valve body comprises a plastic portion forming said outlet and a metal portion forming said inlet and said chamber, said metal portion being crimped over said plastic portion and clamping said porous membrane and said band of said valve member in place across said passage.

* * * * *